United States Patent Office 3,379,685
Patented Apr. 23, 1968

3,379,685
CURABLE EPOXY COMPOUND COMPOSITION
OF MATTER
Erich Preininger, Riehen, and Gustav Ott, Arlesheim, Switzerland, assignors to Ciba Limited, Basel, Switzerland, a Swiss company
No Drawing. Filed July 23, 1965, Ser. No. 474,515
Claims priority, application Switzerland, Aug. 31, 1964, 11,376/64
4 Claims. (Cl. 260—47)

It is known that epoxy resins can be cured with amines to form insoluble, cross-linked masses of high molecular weight. Preferable, used curing agents are diethylenetriamine, ethylenediamine and similar bifunctional or trifunctional primary amines. These amines react with the epoxy resins very rapidly with strong evolution of heat, and the resin+curing agent mixtures gell only a few minutes after having been prepared so that their practical use, for example as casting resins, paints or lacquers, is difficult. Therefore, it has already been proposed to use tertiary amines as curing agents for epoxy resins because they bring about curing with less evolution of heat. As further advantages of tertiary amines there may be mentioned their longer pot life, reduced discoloration in curing at elevated temperatures and the small amounts, namely about 2 to 15%, of amine needed to bring about complete curing of the epoxy resins.

However, mouldings cured with tertiary amines have in general poor mechanical properties, such as flexural strength, impact strength and shear strength, so that in the past tertiary amines by themselves have hardly been used as curing agents in actual practice.

Surprisingly, it has now been found that when certain tertiary amines containing amide groups are used, not only the afore-mentioned advantages of tertiary amines are obtained but at the same time the resulting mouldings have excellent mechanical properties.

Accordingly, the present invention provides a process for curing epoxide compounds having an epoxide equivalence greater than 1, with tertiary amines as curing agent, wherein the curing agent used is a tertiary amine of the formula (I) 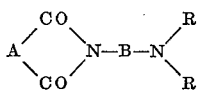

where A represents a hydrocarbon residue which contains at least 2 carbon atoms and to which the two CO-groups are bound through vicinal carbon atoms, preferably being a substituted or unsubstituted cycloalkylene or phenylene group; B represents an alkylene radical containing at least 2, preferably 2 to 6 carbon atoms, and each R represents a lower alkyl, especially a methyl group.

Curing is generally performed at a temperature from 50 to 220° C., preferably from 80 to 180° C.

To the compounds of the Formula I to be used in the present invention belong, for example: N-(3-dimethylaminopropyl)-phthalimide, N-(3-dimethylaminopropyl)-tetrahydrophthalimide, N - (3 - dimethylaminopropyl)-hexahydrophthalimide, N-(3-dimethylaminopropyl)-dodecenylsuccinic acid imide, N-(3-diethylaminopropyl)-hexahydrophthalimide, N-(2-diethylaminoethyl)-phthalimide, N-(6-diethylaminohexyl)-hexahydrophthalimide, N-(4-diethylaminobutyl)-hexahydrophthalimide, N-(2-dihexylaminoethyl)-hexahydrophthalimide, N-(3-dibutylaminopropyl)-hexahydrophthalimide, N-(2-diethylaminoethyl) - hexahydrophthalimide, N - (2 - dimethylaminoethyl)-hexahydrophthalimide, N-(2-dimethylaminoethyl)-5-methyl-Δ⁴-tetrahydrophthalimide, N-(3-dimethylaminopropyl)-3,6-endomethylene-Δ⁴-tetrahydrophthalimide, N-(2-diethylaminoethyl)-3,6-endomethylene-Δ⁴ - tetrahydrophthalimide and N-(2-diethylaminoethyl)-Δ⁴-tetrahydrophthalimide.

For curing the amine of the Formula I is added in the amount usual for tertiary amines, that is to say in an amount of about 2 to 25% referred to the weight of the epoxy resin to be cured.

According to a preferred variant the tertiary amines of the Formula I are used in combination with other, known curing agents for epoxy resins, such as boron trifluoride complexes, amines, acid anhydrides, phenols or the like, or compounds containing hydroxyl groups, such as monohydric or polyhydric alcohols that are not used as such as curing agents for epoxy resins. These additives, which may also be designated as cocatalysts, are used in amounts of 10 to 50 parts for every 100 parts of amine of the Formula I. In view of these proportions these substances are unambiguously additives to the proper curing agent of Formula I of this invention, not examples of the known use of tertiary amines as accelerators in the known curing of epoxy resins by means of anhydrides for which purpose generally 0.01 to 2.5% of amine (referred to the weight of the anhydride) are used.

According to a special variant of the present process a precondensate is prepared at 50 to 130° C. by using a mixture of an amine of the Formula I with a boron trifluoride-amine complex in proportions such that neither of these two components by itself would suffice to bring about complete curing of the epoxy resin, the resulting precondensate being capable of being curred completely at an elevated temperature, preferably ranging from 150 to 200° C. Such precondensates have a pot life of over 1000 hours at room temperature, melt from 80 to 120° C. according to the epoxy resin used and can be advantageously used in combination with fillers by the whirl sintering process for the manufacture of elastic coatings having a good resistance to chemicals. Bonds between metals cemented together with application of heat display considerable shear strength.

The above-mentioned combination of a boron trifluorideamine complex with a tertiary amine of the Formula I makes it possible to manufacture, for example, cured mouldings or protective coatings that possess properties such as could not be achieved with either of the two components used by itself. In the first place, the flexibility of protective coatings can be raised to a multiple of what can be obtained with the tertiary amine or with the boron trifluoride-amine complex used by itself.

Accordingly, the present invention includes also curable mixtures containing (1) An epoxy compound having an epoxide equivalence greater than 1, and
(2) A tertiary amine of the Formula I, as well as the curable precondensates that are obtained when curing is performed in two stages by partially curing the afore-mentioned curable mixtures at 60 to 120° C.

The epoxy compounds having an epoxide equivalence greater than 1, incorporated in the curable mixtures of this invention, contain—referred to the average molecular weight—x epoxide groups, where x is a whole or fractional number greater than 1.

As is known, the conventional methods for the manufacture of polyepoxy compounds furnish as a rule commercial mixtures of compounds having molecular weights that differ from one another, and these mixtures further contain a share of compounds whose terminal epoxide groups have undergone partial hydrolysis. The analytically determined value of the epoxide equivalence of such commercial mixtures need therefore not necessarily be a whole number of at least 2, but in every case it must be greater than 1.0.

As epoxide compounds of the kind defined above there are suitable, for example:

Alicyclic polyepoxides such as vinyl-cyclohexene dioxide, limonene dioxide, dicyclopentadiene dioxide, ethylene glycolbis(3,4 - epoxytetrahydro - dicyclopentadien-8 - yl) - ether, (3,4 - epoxytetrahydro - dicyclopentadien-8 - yl)glycidyl ether; epoxidized polybutadienes or copolymers or butadiene with ethylenically unsaturated compounds, such as styrene or vinyl acetate; compounds containing two epoxycyclohexyl residues, such as diethyleneglycol-bis-(3,4-epoxycyclo-hexane carboxylate), bis-3,4-(epoxycyclohexylmethyl) - succinate, 3,4 - epoxy - 6 - methyl - cyclohexylmethyl - 3,4 - epoxy - 6 - methylcyclohexane carboxylate and 3,4 - epoxyhexahydrobenzal - 3,4 - epoxycyclohexane - 1,1 - dimethanol.

Furthermore, there are suitable polyglycidyl esters such as are obtained by reacting a dicarboxylic acid with epichlorohydrin or dichlorohydrin in the presence of an alkali. Such polyesters may be derived from aliphatic dicarboxylic acids, such as succinic or adipic acid, or especially from aromatic dicarboxylic acids, such as phthalic or terephthalic acid. As examples there may be mentioned diglycidyl adipate and diglycidyl phthalate.

Preferred use is made of polyglycidyl ethers such as are obtained by etherifying a dihydric or polyhydric alcohol or diphenol or polyphenol with epichlorohydrin or dichlorohydrin in the presence of an alkali. These compounds may be derived from glycols such as ethyleneglycol, diethyleneglycol, triethyleneglycol, 1,3-propyleneglycol, 1,4-butyleneglycol, 1,5-pentanediol, 1,6-hexanediol, 2,4,6-hexanetriol, glycerol or especially from diphenols or polyphols such as resorcinol, pyrocatechol, hydroquinone, 1,4-dihydroxy-naphthalene, phenol-formaldehyde condensates of the resol or novolak type, bis-(parahydroxyphenyl)-methane, bis(para-hydroxyphenyl)-methylphenylmethane, bis - (para - hydroxyphenyl)-tolylmethane, 4,4' - dihydroxydiphenyl, bis - (para-hydroxyphenyl)-sulphone or especially from bis-(para-hydroxyphenyl)-dimethylmethane.

Particularly suitable epoxy resins are those which are liquid at room temperature, for example those from bis-(para-hydroxyphenyl)dimethylmethane (bis-phenol A) having an epoxide content of 3.8 to 5.8 epoxide equivalents per kg. Such epoxy resins correspond e.g. to the average formula

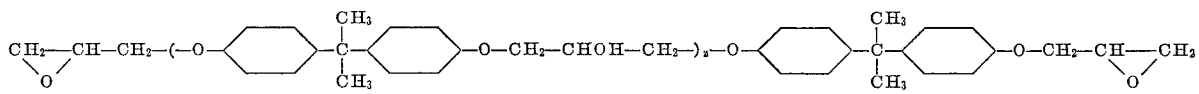

where z is a whole or fractional number from 0 to 2.

There may also be used mixtures of two or more of the epoxy resins mentioned above.

The curable mixtures of this invention may further contain suitable plasticizers such as dibutyl phthalate, dioctyl phthalarate or tricresyl phosphate, or inert diluents or so-called active diluents, especially monoepoxides e.g. butylglycide or cresylglycide.

As mentioned above, the curable mixtures of this invention may contain as additives or catalysts conventional curing agents for epoxy resins, for example: Amines, such as aliphatic or aromatic primary or secondary amines e.g. mono- or dibutylamine, aniline, N-methylaniline, meta - phenylenediamine, bis(4 - aminophenyl) methane, bis(2-methyl-4-amino-phenyl)methane, bis(4-aminophenyl)sulphone, diphenylamine, para-chloraniline, ethylenediamine, N-hydroxyethyl-ethylene-diamine, N,N-diethyl-ethylenediamine, tetra(hydroxyethyl)-diethylenetriamine, diethylenetriamine, triethylenetetramine, diethylamine, piperidine, piperazine, polymers of aminostyrenes, polybasic carboxylic acid anhydrides e.g. phthalic anhydride, methyl-endomethylene tetrahydrophthalic anhydride, dodecenylsuccinic anhydride, hexahydrophthalic anhydride, hexachloro-endomethylene tetrahydrophthalic anhydride, endomethylene-tetrahydrophthalic anhydride, maleic anhydride, succinic anhydride or pyromellitic dianhydride or mixtures of such anhydrides; mono- or polyhydric phenols e.g. phenol, ortho-, meta- or para-cresol, resorcinol, hydroquinone, 2,2-bis(4'-hydroxyphenyl)-propane, or boron trifluoride or complexes thereof, especially its complexes with organic compounds e.g. boron trifluoride complexes with diethyl ether, anisole, monomethylamine, monoethylamine, dimethylamine or benzylamine. Further suitable cocatalysts are mono- or polyhydric alcohols such as butanol, ethyleneglycol, glycerol or mannitol; triarylphosphites such as triphenyl phosphite or tri(para-tolyl)phosphite, and titanic acid esters such as tetrabutyl titanate. It is also possible to use a mixture of two or more of the afore-mentioned co-catalysts.

Furthermore, the curable mixtures of this invention may be admixed at any stage before being cured with fillers, pigments, dyestuffs, flame inhibitors, mould lubricants and the like. Suitable extenders and fillers are, for example, asphalt, bitumen, glass fibres, mica, quartz meal, cellulose, kaolin, ground dolomite, colloidal silica having a large specific surface (Aerosil) or metal powders, such as aluminium powder.

The curable mixtures may be used as they are or in the filled state, if desired in the form of solutions or emulsions, as laminating resins, fluidized bed sintering powders, paints, lacquers, dipping resins, casting resins, moulding compositions, coating compositions, putties, floorings, potting and insulating compounds for the electrical industry, adhesives or the like as well as for the manufacture of such products.

EXAMPLE 1

100.0 grams of Araldite GY 250 (registered trademark of Ciba Ltd. for an epoxy resin containing 5.2 epoxide equivalents per kg., which is liquid at room temperature, prepared by condensing 2,2-bis-(4-hydroxyphenyl)-propane with epichlorohydrin in the presence of an alkali) and 10.0 g. of N-(3-dimethylaminopropyl)-phthalimide were mixed at room temperature, 1 hour later poured into moulds and then cured for 6 hours at 100° C.

The resulting castings revealed the following test data:

Deflection (VSM) _____mm__ Over 16.6
Flexural strength (VSM) _____kg./mm.$^2$__ [1]11.0
Impact strength (VSM) ____cm./kg./cm.$^2$__ Over 24.9
Heat distortion point according to Martens
  (DIN) _____° C.__ 63

[1] Three of 4 tests suffered no fracture on maximum deflection.

EXAMPLE 2

100.0 grams of the epoxy resin mentioned in Example 1 and 5.0 g. of N-(3-dimethylaminopropyl)-tetrahydrophthalimide were stirred for 10 minutes at 63° C., kept for 1 hour in an ambient temperature of 20° C., then poured into moulds and cured for 6 hours at 100° C.

Deflection (VSM) _____mm__ 16.7
Flexural strength (VSM) _____kg./mm.$^2$__ 11.8
Impact strength (VSM) _____cm./kg./cm.$^2$__ 24.6
Heat distortion point according to Martens
  (DIN) _____°C__ 66

EXAMPLE 3

100 grams of the liquid epoxy resin mentioned in Example 1 and 7.5 g. of N-(3-dimethylaminopropyl)-hexahydrophthalimide were mixed at room temperature; the mixture was kept for 1 hour, then poured into moulds and cured for 6 hours at 100° C.

| | |
|---|---|
| Deflection (VSM) _____mm__ | 15.7 |
| Flexural strength (VSM) _____kg./mm.$^2$__ | 11.9 |
| Impact strength (VSM) ____cm./kg./cm.$^2$__ | Over 24.8 |
| Heat distortion point according to Martens (DIN) _____° C__ | 70 |

EXAMPLE 4

100 grams of the liquid epoxy resin mentioned in Example 1 and 10 g. of N-(3-dimethylaminopropyl)-hexahydrophthalimide were mixed at room temperature; the mixture was kept for 1 hour, then poured into moulds and cured for 6 hours at 100° C.

| | |
|---|---|
| Deflection (VSM) _____mm__ | 18.0 |
| Flexural strength (VSM) _____kg./mm.$^2$__ | 11.3 |
| Impact strength (VSM) ____cm./kg./cm.$^2$__ | Over 25.8 |
| Heat distortion point according to Martens (DIN) _____° C__ | 58 |

EXAMPLE 5

100 grams of the liquid epoxy resin mentioned in Example 1 and 5.0 g. of N-(3-dimethylaminopropyl)-hexahydrophthalimide were mixed at room temperature; the mixture was kept for 1 hour, then poured into moulds and cured for 6 hours at 80° C.

| | |
|---|---|
| Deflection (VSM) _____mm__ | 12.7 |
| Flexural strength (VSM) _____kg./mm.$^2$__ | 12.5 |
| Impact strength (VSM) _____cm./kg./cm.$^2$__ | Over 19.2 |
| Heat distortion point according to Martens (DIN) _____° C__ | 68 |

EXAMPLE 6

100 grams of the liquid epoxy resin mentioned in Example 1 and 5.0 g. of N-(3-dimethylaminopropyl)-dodecenyl-succinic acid imide were mixed at room temperature; the mixture was kept for 1 hour, at room temperature, poured into moulds and then cured for 6 hours at 100° C.

| | |
|---|---|
| Deflection (VSM) _____mm__ | 13.4 |
| Flexural strength (VSM) _____kg./mm.$^2$__ | 11.8 |
| Impact strength (VSM) _____cm./kg./cm.$^2$__ | 24.4 |
| Heat distortion point according to Martens (DIN) _____° C__ | 56 |

EXAMPLE 7

(a) Preparing the curing agent 10.0 grams of boron trifluoride-monoethylamine complex were dissolved with stirring at 95° C. in 50.0 g. of N-(3-dimethylaminopropyl)-hexahydrophthalimide, and the solution was clarified by filtration.

(b) Manufacturing the mouldings 100.0 grams of the epoxy resin of Example 1, which is liquid at room temperature, and 7.5 g. of the curing agent prepared according to (a) were mixed at room temperature, the mixture kept for 1 hour and poured into moulds. The material was cured for 1 hour at 100° C. and then immediately afterwards for 1 hour at 200° C.

| | |
|---|---|
| Deflection (VSM) _____mm__ | 13.9 |
| Flexural strength (VSM) _____kg./mm.$^2$__ | 13.6 |
| Impact strength (VSM) ____cm./kg./cm.$^2$__ | Over 24.7 |
| Heat distortion point according to Martens (DIN) _____° C__ | 65 |

EXAMPLE 8

(a) Preparing the curing agent

In the course of 30 minutes 70.5 g. (1.04 mols) of boron trifluoride were introduced into an ice-cooled solution of 238 g. of N-(3-dimethylaminopropyl)-hexahydrophthalimide (1.0 mol) in 1 litre of toluene. After 1 hour's standing at room temperature the crystalline precipitate was suctioned off, washed with 300 ml. of absolute ether and dried for 6 hours at 50° C. under 20 mm. Hg pressure. The resulting boron trifluoride complex melted at 110 to 116° C. The yield amounted to 290.7 g.=95% of the theoretical.

100.0 grams of the above boron trifluoride complex were dissolved in 400 g. of N-(3-dimethylaminopropyl)-hexahydrophthalimide by heating to 90° C., then allowed to cool and clarified by filtration. This solution was stable for a few days only, after which the boron trifluoride complex precipitated again in crystalline form.

(b) Manufacturing the mouldings 100.0 grams of the epoxy resin of Example 1, which is liquid at room temperature, and 7.5 g. of the curing agent prepared according to (a) were mixed at room temperature and the mixture was kept for 1 hour, then poured into moulds and cured for 1 hour at 100° C. and immediately afterwards for 1 hour at 200° C.

| | |
|---|---|
| Deflection (VSM) _____mm__ | 13.1 |
| Flexural strength (VSM) _____kg./mm.$^2$__ | 12.5 |
| Impact strength (VSM) _____cm. kg./cm.$^2$__ | Over 21.7 |
| Heat distortion point according to Martens (DIN) _____° C__ | 68 |

EXAMPLE 9

(a) Preparing the curing agent 30.0 grams of 4,4'-diaminodiphenylsulphone were dissolved in 70.0 g. of N-(3-dimethylaminopropyl)-hexahydrophthalimide by heating to 130° C. When this solution was allowed to cool, 4,4'-diaminodiphenylsulphone again crystallized out from it partially after a short time. The mouldings were manufactured from a still clear solution.

(b) Manufacturing the mouldings 100.0 grams of the epoxy resin of Example 1, which is liquid at room temperature, and 10.0 g. of the curing agent prepared according to (a) were mixed at room temperature; the solution was kept for a short time, then poured into moulds and cured for 6 hours at 100° C.

| | |
|---|---|
| Deflection (VSM) _____mm__ | 13.4 |
| Flexural strength (VSM) _____kg./mm.$^2$__ | 12.9 |
| Impact strength (VSM) _____cm. kg./cm.$^2$__ | Over 24.0 |
| Heat distortion point according to Martens (DIN) _____° C__ | 73 |

EXAMPLE 10

100.0 grams of the epoxy resin used in Example 1, which is liquid at room temperature, and 10.0 g. of N-(3 - dimethylaminopropyl) - hexahydrophthalimide were mixed at room temperature. Degreased and ground aluminium sheets, measuring 175 x 25 x 1.5 mm., marketed under the registered trademark "Anticorodal B," were cemented together with an overlap of 10 mm. and heated for 30 minutes at 150° C. The resulting cemented bond displayed a shear strength of 2.88 kg./mm.$^2$.

EXAMPLE 11

100 grams of Araldite GY 250 (registered trademark) were mixed at room temperature with one of the undermentioned tertiary amines as curing agent and then poured into moulds and cured of the castings was then measured. The results obtained with the tertiary amines N-(3-dimethylaminopropyl)-hexahydrophthalimide (A), pentamethyl-diethylenetriamine (B) and N,N-dimethylaminocyclohexane (C) are summarized in the following

TABLE 1

| Test No. | Curing agent [1] | Mols of amine-nitrogen per mol of epoxide | Impact strength (VSM) cm.-kg./cm.[2] |
|---|---|---|---|
| 1 | 7.5 (A) | 0.06 | Over 24.8. |
| 2 | 2.0 (B) | 0.07 | 8.8. |
| 3 | 5.0 (C) | 0.07 | 7.9. |

[1] Grams of curing agent per 100 g. of Araldite GY 250 (registered trademark).

EXAMPLE 12

30 grams of diglycidyl ether of polypropyleneglycol of molecular weight 1025, 50 g. of titanium dioxide (rutile modification), 520 g. of Araldite 6071[1], 550 g. of Araldite 6084[2] and 50 g. of Aerosil[3] were intimately mixed in a kneader at 100° C., and in the course of 2 to 3 minutes 50 g. of N-(3-dimethylaminopropyl)-hexahydrophthalimide and 20 g. of "Curing Agent 1040" (boron trifluorideamine complex of Anchor Chem. Corp.) were stirred in. The mixture was immediately spread over a polyethylene foil to form a layer 5 to 10 mm. thick. After having cooled, the brittle substance was disintegrated, ground in a rod mill and sifted to a particle size below 150μ.

Degreased sheets of iron, preheated at 180° C., were coated with this powder by the fluidized bed sintering process, and then cured for 45 minutes at 180° C. For a layer thickness from 200 to 300μ the coatings displayed an Erichsen deep-drawing value (DIN 53156) greater than 9 mm. and an impact depression of 90 cm./2 kg. in the coating. The impact depression was produced with Niesen's impact tester described in the book by Dr. Felix Wilborn "Physikalische and Technische Prüfverfahren für Lacke and Ihre Rohstoffe," 1953, volume II, page 642.

EXAMPLE 13

In the course of 3 minutes at 100° C. 50 g. of N-(3-dimethylaminopropyl)-hexahydrophthalimide and 5 g. of boron trifluoride-monoethylamine complex were stirred into a mixture of 30 g. of diglycidyl ether of polypropyleneglycol having a molecular weight of 1025, 50 g. of titanium dioxide (rutile modification), 520 g. of Araldite 6071, 550 g. of Araldite 6084 and 50 g. of Aerosil, and the melt was cast in a thin layer over a polyethylene foil. After having been allowed to cool, the precondensates prepared in this manner displayed a Kofler softening point of 95° C.

The brittle resin lumps were crushed, ground in a rod mill and sifted to a particle size below 150μ. Degreased sheets of iron, preheated at 180° C., were coated with this powder by the fluidized bed sintering process or with the aid of an electrostatic powder spray gun, and the coating was then cured by being heated for 45 minutes at 180° C. The coating was found to be very flexible and resistant to impacts. For a layer thickness of 200 to 300μ an Erichsen deep-drawing value (DIN 53156) of over 9 mm. and an impact depression in the coating of 75 cm./2 kg. were measured.

EXAMPLE 14

A whirl sintering powder was prepared exactly as described in Example 13, except that 50 g. of N-(3-dimethylaminopropyl)-hexahydrophthalimide were used as curing agent.

[1] Araldite 6071 is the registered trademark of Ciba Ltd. for an epoxy resin based on bisphenol A and epichlorohydrin, having a Kofler softening point of 50° C. and containing 2.1 mols of epoxide groups per kg.
[2] Araldite 6084 is the registered trademark of Ciba Ltd. for an epoxy resin based on bisphenol A and epichlorohydrine, having a Kofler softening point of 75° C. and containing 1.1 moles of epoxide groups per kg.
[3] Aerosil is the registered trademark of Messrs. Degussa for a finely dispersed silica having a large inner surface.

Test panels prepared in identical manner revealed an impact depression of only 10 cm./kg.

EXAMPLE 15

A whirl sintering powder was prepared exactly as described in Example 13, except that 50 g. of boron trifluoride-monoethylamine complex were used as curing agent.

Test panels prepared in identical manner revealed an impact depression of only 60 cm./kg.

A comparison of Examples 13, 14 and 15 reveals unambiguously the synergistic effect of the boron trifluorideamine complexes added according to this invention to compounds of the Formula I.

What is claimed is:

1. A curable composition of matter, comprising
   (1) a 1,2-epoxy compound having a 1,2-epoxide equivalency greater than 1 and
   (2) as curing agent, a tertiary amine of the formula

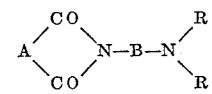

where A represents a bivalent hydrocarbon residue which contains at least 2 and at the most 20 carbon atoms and which is bound with the two CO-groups through vicinal carbon atoms, B represents an alkylene radical containing 2 to 6 carbon atoms, and R represents a lower alkyl group, with 1 to 4 carbon atoms.

2. A curable composition of matter, comprising
   (1) a 1,2-epoxy compound having a 1,2-epoxide equivalency greater than 1 and
   (2) as curing agent, a tertiary amine of the formula

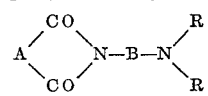

where A represents a bivalent hydrocarbon residue which contains at least 2 and at the most 20 carbon atoms and which is bound with the two CO-groups through vicinal carbon atoms, B represents an alkylene radical containing 2 to 6 carbon atoms, and R represents a lower alkyl group, with 1 to 4 carbon atoms, and
   (3) as further curing agent a member selected from the group consisting of boron trifluoride-amine complex primary amines, secondary amine, polybasic carboxylic acid anhydrides, monohydric phenols, polyhydric phenols and triaryl phosphites.

3. A curable precondensate which is obtained by heating a 1,2-epoxy compound having a 1,2-epoxide equivalency greater than 1 with a tertiary amine of the formula

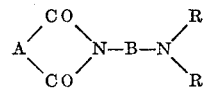

where A represents a bivalent hydrocarbon residue which contains at least 2 and at the most 20 carbon atoms and which is bound with the two CO-groups through vicinal carbon atoms, B represents an alkylene radical containing 2 to 6, carbon atoms, and $R_3$ represents a lower alkyl group with 1 to 4 carbon atoms at a temperature within the range from 60 to 120° C.

4. A curable precondensate which is obtained by heating a 1,2-epoxy compound having a 1,2-epoxide equivalency greater than 1 with a tertiary amine of the formula

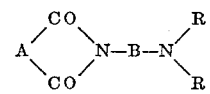

where A represents a bivalent hydrocarbon residue which contains at least 2 and at the most 20 carbon atoms and which is bound with the two CO-groups through vicinal carbon atoms, B represents an alkylene radical containing 2 to 6, carbon atoms, and $R_3$ represents a lower alkyl group with 1 to 4 carbon atoms and with a member selected from the boron trifluoride-amine complexes, primary amines secondary amines, polybasic carboxylic acid anhydride, monohydric phenols, polyhydric phenols and triaryl phosphites at a temperature within the range from 60 to 120° C.

References Cited

UNITED STATES PATENTS 2,444,333   6/1948   Castan _____ 260—47

WILLIAM H. SHORT, *Primary Examiner.*

T. D. KERWIN, *Assistant Examiner.*